Sept. 5, 1950     C. F. DUTTON     2,521,506
TRANSPARENCY HOLDER FOR PROJECTION LANTERNS
Filed Feb. 3, 1948     7 Sheets-Sheet 1
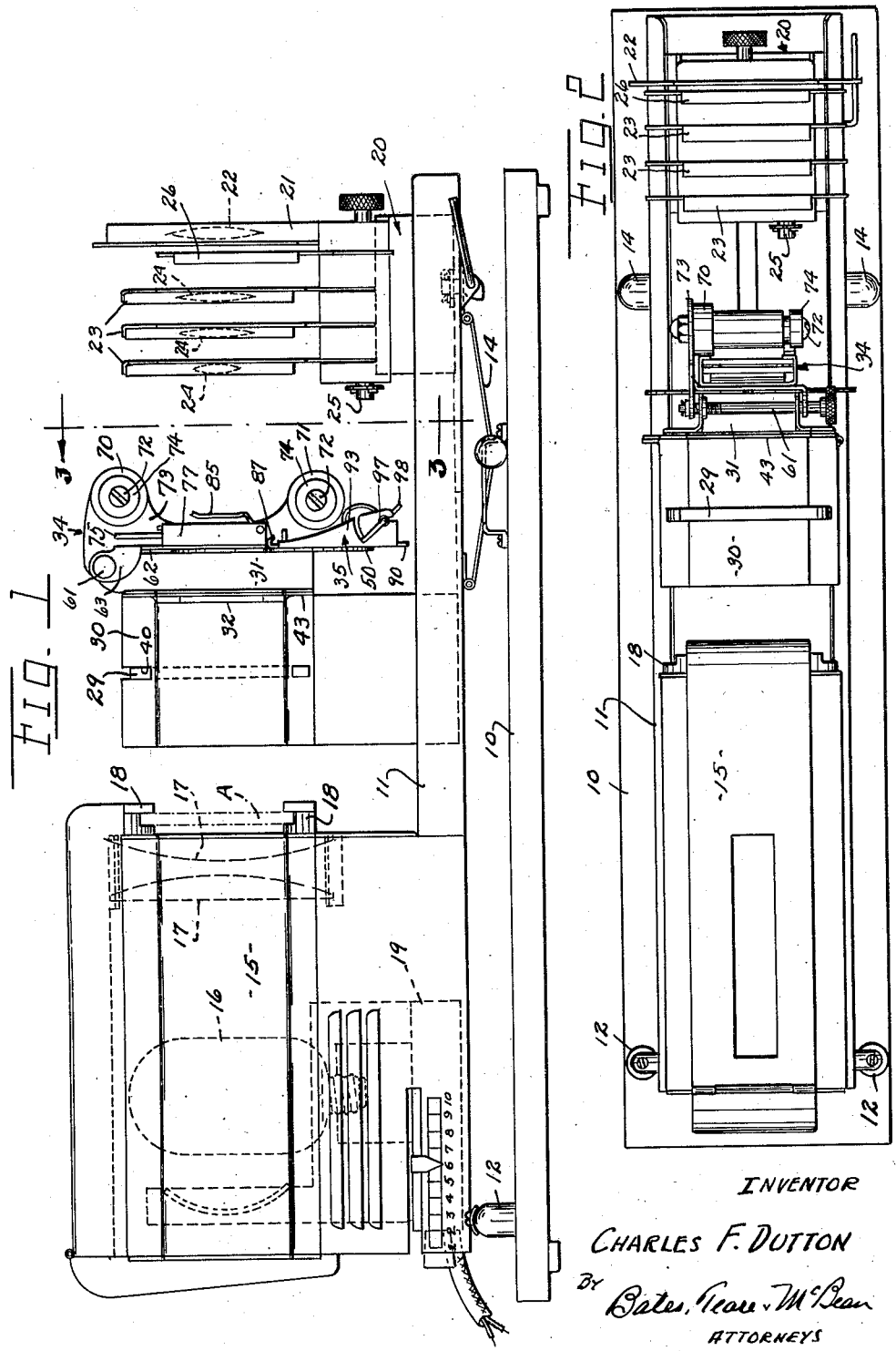
INVENTOR
CHARLES F. DUTTON
BY Bates, Teare + McBean
ATTORNEYS Sept. 5, 1950 C. F. DUTTON 2,521,506
TRANSPARENCY HOLDER FOR PROJECTION LANTERNS
Filed Feb. 3, 1948 7 Sheets-Sheet 2
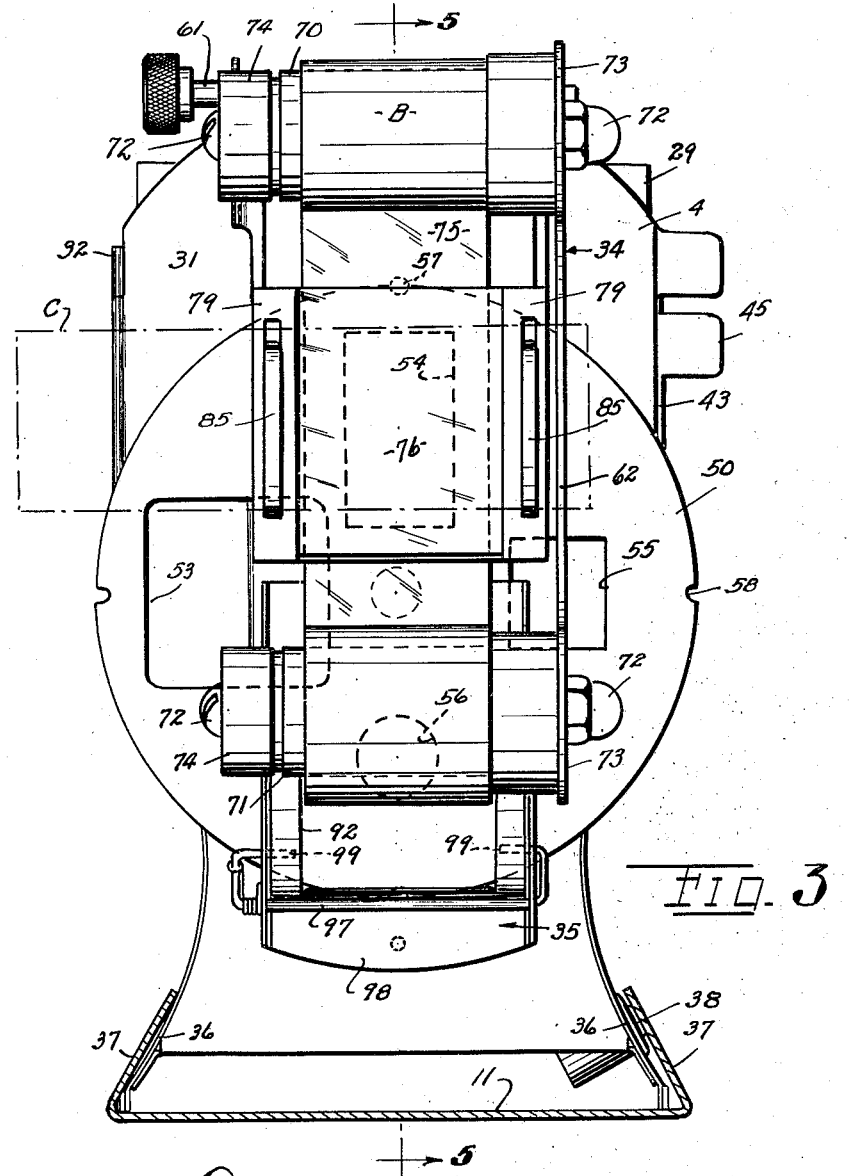
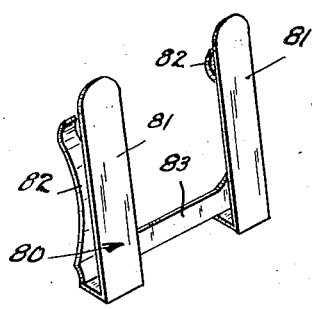
INVENTOR
CHARLES F. DUTTON
By Bates, Teare, y McBean
ATTORNEYS Sept. 5, 1950           C. F. DUTTON           2,521,506

TRANSPARENCY HOLDER FOR PROJECTION LANTERNS

Filed Feb. 3, 1948           7 Sheets-Sheet 3

INVENTOR
CHARLES F DUTTON
By Bates, Teare, McBean
ATTORNEYS

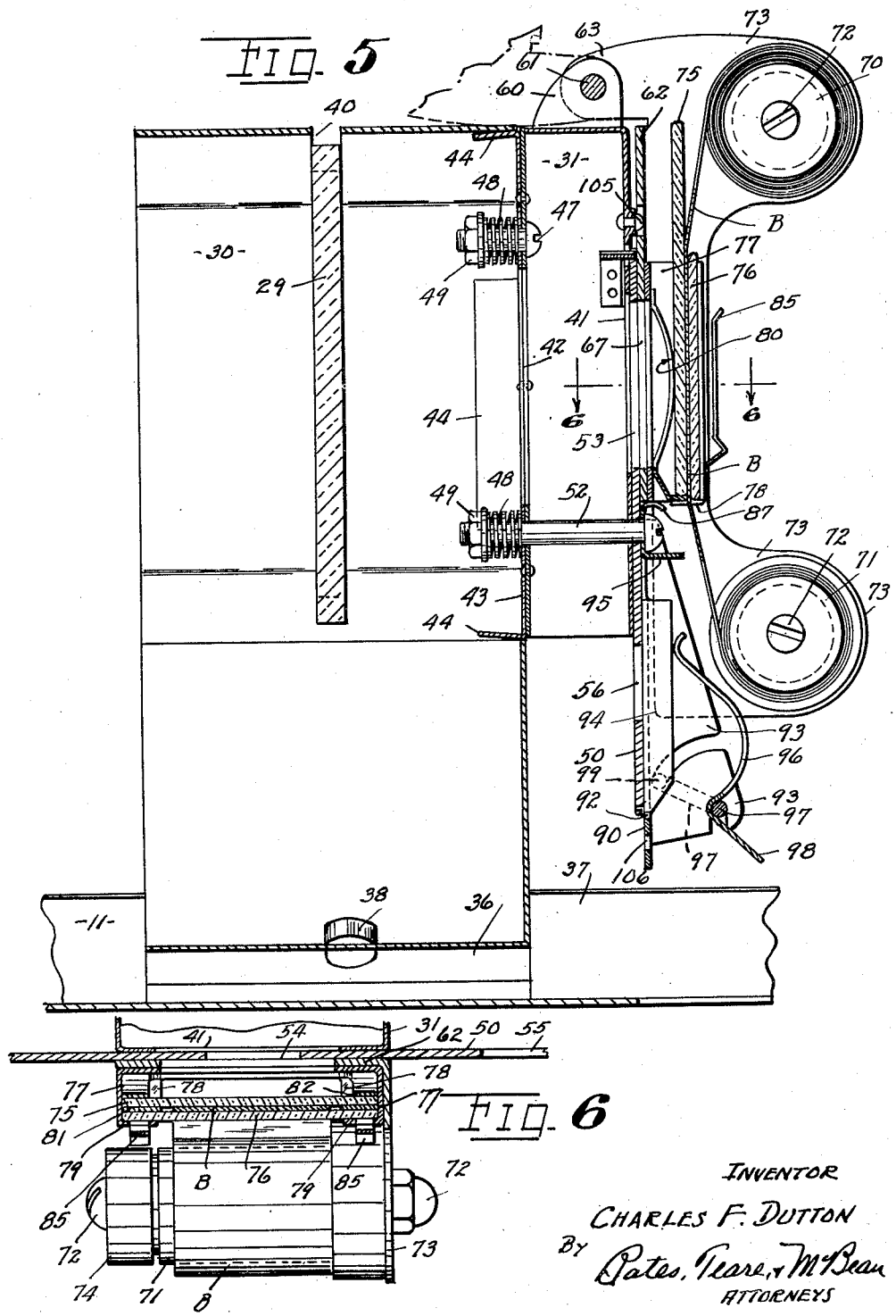

Sept. 5, 1950            C. F. DUTTON            2,521,506
TRANSPARENCY HOLDER FOR PROJECTION LANTERNS Filed Feb. 3, 1948            7 Sheets-Sheet 5

INVENTOR
CHARLES F. DUTTON
By Bates, Teare & McBean
ATTORNEYS

Sept. 5, 1950  C. F. DUTTON  2,521,506
TRANSPARENCY HOLDER FOR PROJECTION LANTERNS
Filed Feb. 3, 1948  7 Sheets-Sheet 6

INVENTOR
CHARLES F. DUTTON
BY Bates, Teare, y McBean
ATTORNEYS

Sept. 5, 1950        C. F. DUTTON        2,521,506
TRANSPARENCY HOLDER FOR PROJECTION LANTERNS
Filed Feb. 3, 1948        7 Sheets-Sheet 7
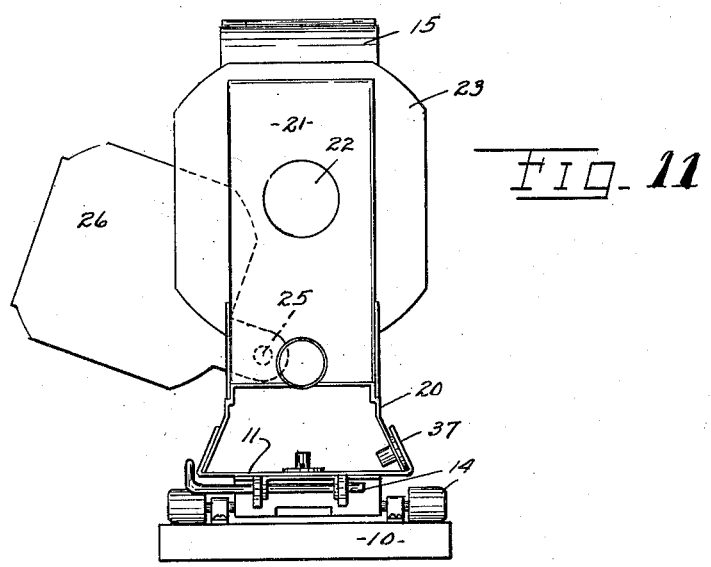
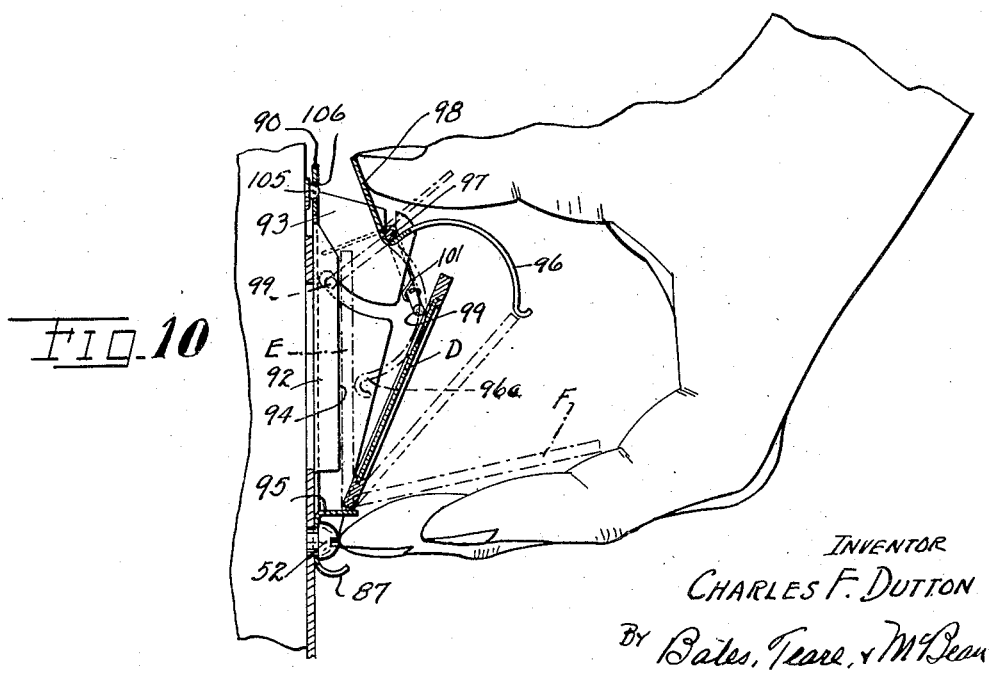
INVENTOR
CHARLES F. DUTTON
BY Bates, Teare, & McBean
ATTORNEYS Patented Sept. 5, 1950

2,521,506

UNITED STATES PATENT OFFICE 2,521,506

TRANSPARENCY HOLDER FOR PROJECTION LANTERNS

Charles F. Dutton, Rocky River, Ohio

Application February 3, 1948, Serial No. 6,027

14 Claims. (Cl. 88—28)

This invention relates to a projection lantern and is a continuation in part of my copending application of Letters Patent filed May 29, 1946, and assigned Serial No. 673,025, now Patent No. 2,512,314, issued June 20, 1950.

The present invention is particularly concerned with an improved projection lantern for use in connection with the projection of various types of transparencies such as films or slides of various sizes. Further, this invention relates to an improved transparency holder for a projection lantern or the like. These, therefore, are the general objects of the present invention.

A more specific object of the present invention is to provide a projection lantern for use in connection with illustrated lectures, instruction courses, and the like, and which will permit a change from a transparency of one type or size to a transparency of another type or size to be made with ease and rapidity.

A further object of the present invention is to provide a projection lantern for use either with strip film or with small individual transparencies, wherein the projection of the strip film may be interrupted at desired intervals for projection of individual transparencies and then the projection of the strip film resumed with a minimum amount of delay.

Other objects and advantages of the present invention will become more apparent from the following description of a preferred embodiment illustrated in the accompanying drawings. The essential and novel features of the invention will be set forth in the claims.

Figure 4:
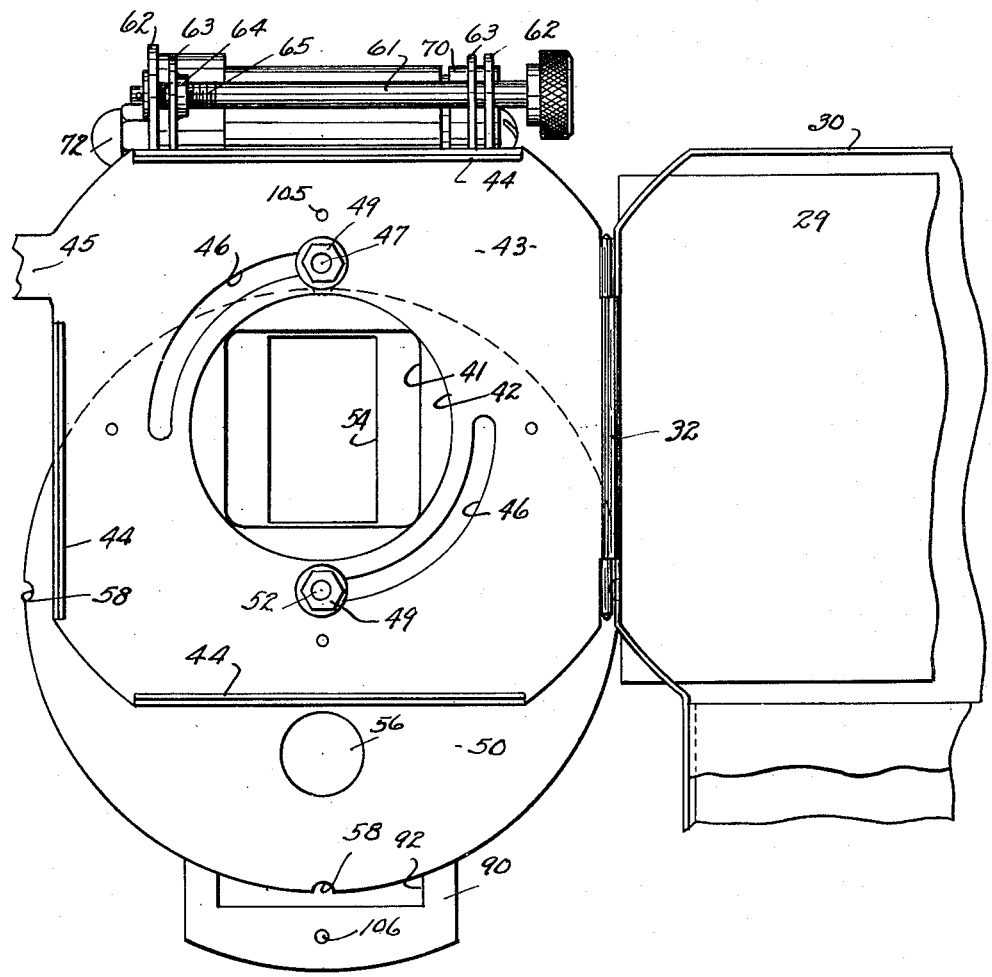
Figure 8:
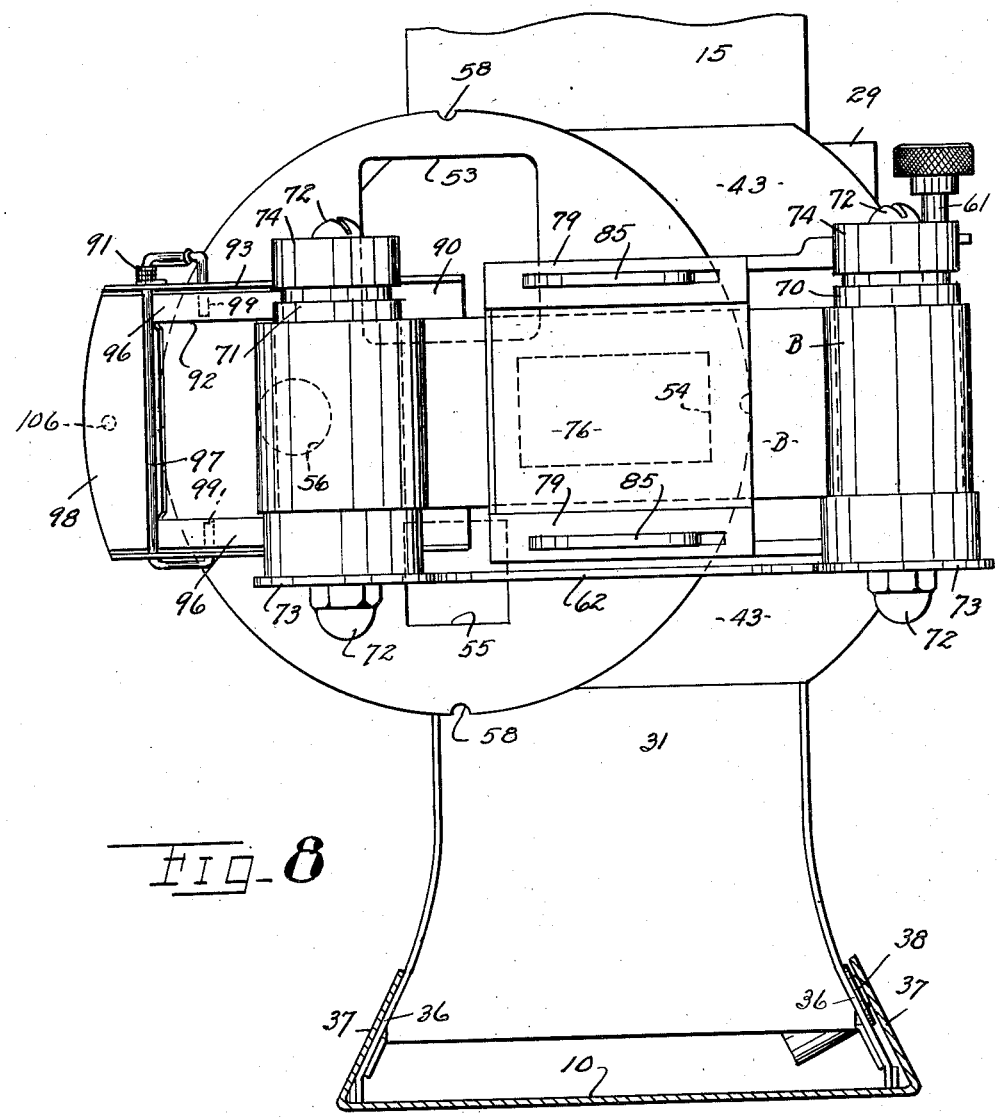
Figure 9:
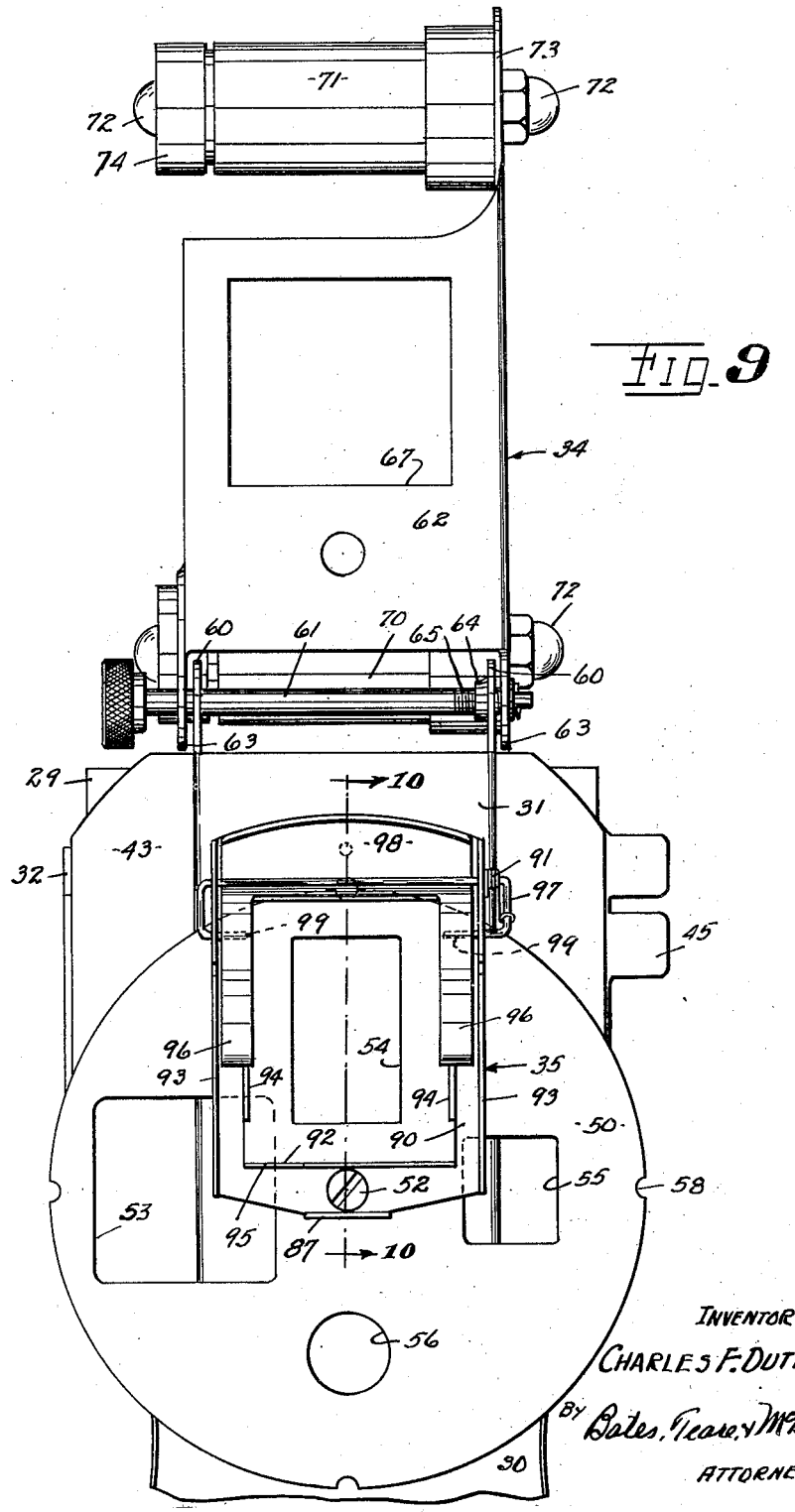

In the drawings, Fig. 1 is a side elevation of the improved lantern illustrating it as used for the projection of strip film; Fig. 2 is a plan view of the lantern as shown in Fig. 1; Fig. 3 is an enlarged transverse vertical section as indicated by the line 3—3 on Fig. 1 and illustrates the transparency holding mechanism in front elevation; Fig. 4 is a view similar to Fig. 3 but illustrating the transparency holder swung to an idle position out of the path of projected light; Fig. 5 is a longitudinally extending vertical section through the transparency holder and associated parts, the plane of the section being indicated by the lines 5—5 on Fig. 3; Fig. 6 is a fragmentary horizontal section through the transparency holder mechanism, the plane of the section being indicated by the lines 6—6 on Fig. 5; Fig. 7 is a perspective view of one of the parts of the transparency holder; Fig. 8 is a view similar to Fig. 3 but illustrating the strip film mechanism in a horizontal position as contrasted with the vertical position shown in Fig. 3; Fig. 9 is a view similar to Figs. 3 and 8, but illustrating the transparency holding mechanism in condition for use with individual transparencies; Fig. 10 is a sectional detail illustrating the method of discharging individual transparencies from the holder, the plane of the section being indicated by the lines 10—10 on Fig. 9; and Fig. 11 is a front elevation of the projection machine.

sectign etaoin shrdlu cmfwyp vbgkqj xzfiflfffi fi

The projection lantern, as shown, comprises in general a support 10 on which is mounted an elongated base 11. This base is mounted for rocking movement on the members 12 mounted at the rear end of the support 10. Accordingly the front end of the base may be elevated as desired to control the direction of the path of projected light. An elevating mechanism, generally indicated at 14, controls the degree of tilt of the base 11.

A lamp housing 15 is mounted on the base 11 adjacent the rear end thereof, and an illuminating lamp 16 is positioned within this housing. The lamp 16 is carried by a support 19 which is mounted for longitudinal adjustment on the base 11. A pair of condensing lenses 17 are mounted in the front end of the lamp housing.

A transparency holder 18 for comparatively large transparency slides is attached to the housing in front of the lenses 17. As indicated in Fig. 1, the holder 18 comprises a pair of oppositely facing channel members arranged to receive a transparency A in the usual manner.

Mounted at the forward end of the base 11, and movable longitudinally thereof, is a lens carrier 20. A light shield 21 carrying a projecting lens 22, and a series of independently movable lens holders 23 are mounted on the carrier 20. The lens holders 23 are pivotally mounted on a shaft 25 supported by the carrier and may be swung into or out of position with their lenses in the path of projection light as desired. Also pivoted to the shaft 25 for movement into and out of the path of light is a light impervious shield 26. This lens carrier 20 forms part of the subject matter of my copending application, heretofore referred to, and reference may be had to such application for a more detailed description thereof.

Positioned intermediate the lamp housing 15 and the lens holder 20 is a housing 30. This housing, like the lamp support 19 and lens holder 20, is supported by and movable longitudinally on the base 11. Extending across the housing 30, in the path of the projected light, is a pane of heat absorbing and heat resisting glass 29. The glass 29 protects the film, slides or other transparencies carried by a transparency carrier 31, pivotally mounted as at 32, to the front end of the housing 30.

The present invention is particularly concerned with the construction and arrangement of the transparency carrier 31. This carrier is adapted to carry either a strip film or individual transparencies, and for this purpose is provided with a holder 34 to receive an elongated strip or small reel of film and guide it past the path of projected light from the lamp 16, and with a holder 35 to receive individual transparencies and position them in the path of projected light. Either the holder 34 or the holder 35 may be brought into or out of active position relative to the path of projected light as desired.

The housing 30 is a substantially rectangular-shaped box open at its front and rear ends, and having outwardly flared side portions 36 adjacent its base which form a slide extending into the base 11 and coacting with inwardly extending side flanges 37 thereof to retain the housing 30 on the base. One of the flared edge portions 36 of the housing 30 carries a spring pressed plunger 38 which frictionally engages the corresponding flange 37 of the base to retain the housing in an adjusted position. The upper portion of the housing 30 is provided with a vertically extending transverse slot 40 to receive the pane 29 of heat resisting and absorbing glass which extends across the path of projected light, as heretofore explained.

The transparency carrier 31 comprises a rectangular box-like structure having openings 41 and 42 in its front and rear walls respectively through which the projected rays of light pass from the lamp housing 15 to the lenses 22 and 24. The carrier 31 is supported, on a plate 43, for rotation about the axis of the path of projected light. The plate 43 is mounted for pivotal movement about a vertical axis, offset from such path, so that the entire transparency carrier may be swung from an active position, such as that shown in Fig. 3, to an inactive position out of the path of projected light as indicated in Fig. 4. This permits the lantern to be used with comparatively large lantern slides which are inserted in the holding members 18 carried by the lamp housing 15 and heretofore described.

As shown in Figs. 1 and 3, the left hand edge of the plate 43 is hinged, as indicated at 32, to the adjacent side wall of the housing 30. The edges of the plate 43 are flanged inwardly as at 44 to seat in the open face of the housing 30 and frictionally engage the walls of such opening. Any suitable latch mechanism (not shown) may be used to retain the plate 43 and the transparency carrier 31 supported thereby in position on the housing 30. A projection or handle 45 may may be provided to facilitate movement of the unit into and out of active position.

As heretofore mentioned, the transparency carrier 31 is mounted for rotation about the axis of the path of projected light. As shown in the drawings, the carrier 31 is rotatably mounted on the plate 43 so that the transparency, which is in active position, may be changed from a vertical to a horizontal position. As illustrated in Figs. 4 and 5, the plate 43 is provided with a pair of arcuate slots 46 through which bolts 47, carried by the carrier 31, pass. The carrier 31 is retained in frictional engagement with the face of the plate 43 by compression springs 48 which encircle the rearwardly projecting ends of the bolts 47 and 52 intermediate retaining members 49 and the inner face of the plate 43. Thus the transparency carrier, as for instance the holder 34, which is supported by the carrier 31, may be swung from the vertical position, illustrated in Figs. 3, 4 and 5, ninety degrees to the horizontal position illustrated in Fig. 8.

The carrier 31 is provided with an adjustable framing shield 50 which determines the shape of the outline of the rays of light projected from the lantern. As illustrated in Fig. 5, the lower bolt 52 extends entirely through the carrier 31 and forms a pivot for the shield 50. This shield is circular and is provided with four apertures 53, 54, 55 and 56. The aperture 53 is rectangular and substantially the full size of the opening 41 in the front wall of the carrier 31. The aperture 54 is rectangular in shape and substantially the height of the opening in the carrier but narrower than such opening. The opening 55 is a relatively small rectangular opening, and the opening 56 is a circular opening. These openings are positioned ninety degrees apart and are so arranged that when the disc or shield 50 is rotated about its pivotal axis, namely the stud 52, any one of the openings may be selectively brought into alignment with the path of projected light passing through the openings 41 and 42 in the carrier 31. A spring tongue or detent 57 secured to the inner wall of the carrier 31 and extending through an opening in the front wall thereof and coacting with peripheral notches 58 in the shield serves to retain the shield 50 in any one of its adjusted positions.

The strip film holder 34 is pivotally mounted on the carrier 31 so that it may be swung into and out of active position relative to the path of projected light. As shown in the drawings, the carrier 31 is provided with a pair of spaced upstanding ears 60 in which a rod 61 is journalled. The strip film holder 34 comprises a normally vertically extending plate or base 62 having a pair of spaced rearwardly projecting ears 63, one of which is pivotally mounted on the rod 61, and the other of which is provided with a boss 64 threadingly engaging a threaded portion 65 of the rod 61. This construction permits the entire holder 34 to be adjustably positioned transversely relative to the path of projected light, and to be swung about the axis of the rod 61 from the active position shown in Figs. 3 and 5 to the inactive position shown in Fig. 9. In the former position an opening 67 in the base plate is in axial alignment with the openings 41 and 42 of the carrier 31 and with the path of projected light.

The base plate 62 carries a pair of spools 70 and 71. As shown in the drawings, this plate 62 has a pair of forwardly projecting ears 73 positioned adjacent the top and bottom of the plate respectively and to each of which a laterally extending stud 72 is secured. The spools 70 and 71 are journalled on respective studs 72 and either spool may have a wound-up strip of film B mounted on it, the free end of such strip being attached to the other spool. Each of the spools is provided with a head 74, and each spool has sufficient friction with its respective stud or with the respective supporting ear 73 to maintain the film taut, and allow it to be readily progressed in either direction by merely turning the appropriate knob 74.

The film B in passing from one spool to the other extends between a pair of glass plates 75 and 76. The inner plate 75 preferably extends upwardly some distance above the outer plate 76, and the top edges of each plate are beveled, as shown in Fig. 5, to facilitate insertion on the strip film therebetween. The glass plates 75 and 76 are mounted in a receptacle comprising a pair of channel-shaped side members 77 which are secured to the base plate 62 in any well-known manner as by welding or the like. The lower ends of these members are bent inwardly as at 78 at their bottom ends so that the plates 75 and 76 may rest thereon by gravity.

The plates 75 and 76 are normally maintained spaced from each other, and are normally urged outward, toward the outer lips 79 of the channel-shaped members 77, by a spring unit 80. This unit is shown in Figs. 5 and 7, and comprises a pair of U-shaped members joined by a connecting strip 83. Each of these members has one straight leg 81, of a width slightly greater than the thickness of the strip of film B, and a second or rear leg 82 which is arched toward the leg 81. Accordingly the pane of glass 75 may be inserted between the two legs 81 and 82 which are connected by a strap 83, and the other pane 76 may be inserted between the front legs 81 and the lips 79 of the channel-shaped retainers 77. Thus, the rear pane of glass 75 may be pushed rearwardly against the action of the spring member 80 to separate the two panes for ready insertion of the strip film.

Some transparencies have the form of more or less rigid elongated strips, such as indicated in Fig. 3 by the dot and dash lines C. To facilitate the use of the machine with such transparencies, the members 77 are each provided with a retaining clip 85. These clips each comprise a narrow ribbon of metal struck outwardly from the front lip 79 of the respective member 77. The transparency C may be readily positioned between these clip members and the members 79.

The strip film holder 34, as heretofore mentioned, may be swung as a unit about the axis of the rod 61 from the position shown in Figs. 3 and 5 to the position shown in Fig. 9. When in the uppermost position the holder 34 is tilted slightly to the rear so that the upper edge of the base 62 rests on top of the housing 30 as indicated by the dot and dash lines in Fig. 5. In such position the entire holder 34 is out of the path of projected light. The holder 34 is normally retained in its active position, shown in Fig. 5, by a member 87 of the retainer 35, later to be described in detail, and which is carried by the bolt 52. The member 87 engages the lower edge of the base plate 62 as indicated in Fig. 5 and retains it in its active position.

The holder 35 for individual transparencies is pivotally mounted on the stud 52 so that it may be swung from an idle position shown in Figs. 3, 4 and 5 into an active position as shown in Fig. 9. As there shown, the holder 35 comprises a base or plate 90 which is pivotally mounted on the bolt 52 with its inner surface bearing against the shield plate 50. The base 90 is retained in frictional engagement with the shield 50 by the spring 48 heretofore described.

The base 90 is provided with a central opening 92 which, when the device is in its active position as shown in Figs. 9 and 10, is in alignment with the path of projected light. As shown in the drawing, the sides of the base plate 90 are bent outwardly as at 93, and adjacent its bottom (Fig. 10) the plate 90 is provided with a horizontal flange 95. Accordingly a transparency, such as indicated in Fig. 10 at D, may be positioned with its lower edge resting on the flange 95 between the flanges 93 as indicated by the dotted lines E. When in this position the transparency is retained in place by a pair of arms 96 which engage the transparency to either side of the beam of projected light. The arms 96 are secured to a rod or pin 97 carried in the flanges 93 and are normally retained in the dot and dash line position 96a (Fig. 10) by a spring 101. When it is desired to release the transparency, the arms 96 are raised by pushing inwardly a tongue 98 which is secured to the rod 97, thus moving the arms to the full line position shown in Fig. 10. As the arms 96 move to the latter position, the inturned ends 99 of the rod 97 coact with the inner surface of the transparency D tilting it outward until it falls into the hand of the operator as indicated by the dot and dash line position F. Accordingly, to discharge the transparency it is only necessary for the operator to place his hand in front of the carrier as indicated in Fig. 10 and with his thumb tip the arm 98 rearwardly thus causing the transparency to tip forwardly into the operator's fingers which extend beneath the carrier.

The transparencies D, when in the projection position (E in Fig. 10), are spaced from the body of the base 90 of the carrier 35 by the edges of a pair of flanges 94 which are bent out of the body of the base adjacent its central opening 92.

The transparency holder 35 is normally retained in its active position, with its transparency in the path of projected light, by a spring pressed plunger 105 carried by the housing 31 and which engages an opening 106 in the base plate 90 of the holder 35. The holder is retained in its inactive position out of the path of the projected light as shown in Fig. 5 by the engagement of the tongue 85 thereof with the bottom edge of the base 62 of the strip film holder 34.

It will be well understood from the drawings and description above given that my improved projecting lantern provides for carrying film and slides of various types and sizes and for readily substituting one for the other. It will likewise be apparent that when the lantern is used for the projection of images from strip film, such projection may be interrupted for brief intervals to facilitate the projection of images from individual transparencies following which the projection from the strip film is resumed. The arrangement is such as to enable ready change from one type of transparency to another without danger of the parts being misplaced. The mechanism for discharging the exhibited individual transparencies is very simple, effective and enables quick operation without danger of injuring the transparency. This is particularly advantageous with transparencies of the type comprising a relatively thin flexible film in a pasteboard frame as is in common use today.

I claim:

1. In a projection lantern, the combination of a base, a source of projected light carried thereby, a transparency carrier carried by the base in front of the source of light and comprising a member pivoted to said base for movement about an axis offset from the path of projected light for pivotal movement from a position extending across such path to a position out of such path, said member having an opening through which the projected light passes when the member is in the first named position, said member having two pivoted transparency holders thereon, each of said holders being movable about its pivot to be positioned to extend across the opening in the member and across the path of projected light, and means on each of said holders for carrying a transparency.

2. In a projection lantern, a base, a source of illumination carried thereby, a transparency carrier carried by the base in front of the source of illumination and comprising a box having two pivoted members thereon either of which may be positioned to extend across the open front of the box in the path of projected light, and means on each of said carriers for carrying a different type of transparency, one of said members being pivoted for movement about an axis transverse to the path of projected light, and the other being pivoted for movement about an axis parallel with but offset from the axis of the path of projected light.

3. In a projection lantern, a transparency carrier, a pair of transparency holders individually pivoted to said carrier for movement into and out of the path of projected light and each having an opening through which such light passes, and means on one of said holders and acting when said holder is in its idle position to retain the other holder in its active position.

4. In a projection lantern, the combination with means for carrying a lamp, of an open-ended box through which the projected light passes, a door hinged on a vertical axis to said box and adapted to swing from an idle position to a position extending across the path of projected light, a transparency holder pivoted to said door for movement about a horizontal axis and carrying a transparency, said holder being movable about its pivot from a position in the path of the projected light to a position out of the path of the projected light, a second transparency holder pivoted about a horizontal axis spaced from the first named axis and movable about its pivot from a position out of the path of projected light to a position where the transparency carried thereby is in the path of projected light, and means on one of said holders and active when such holder is out of the path of projected light to retain the other holder in position in such path.

5. A projection lantern, a transparency carrier therefor comprising a member extending across the path of projected light and having an opening through which such light passes, a pair of transparency holders independently mounted on said member for movement relative to each other and to said member, each holder being adapted to carry a transparency, and means on one holder and cooperating with the other holder to maintain one holder in position in the path of light and the other holder in a position out of the path of projected light.

6. In a projection lantern, a lamp, an objective lens, a transparency carrier disposed between the lamp and said lens, said carrier comprising a box open to light rays at the end adjacent the lamp and having an open front at the end adjacent the lens, a door hinged to one vertical edge on the box at the front thereof and having an opening for the passage of light rays, a transparency holder pivoted at the top of said door for movement about a horizontal axis into and out of the path of projected light, a second transparency holder mounted on said door for pivotal movement about an axis parallel with the path of projected light and movable into and out of said path, and means on each holder for holding a transparency.

7. In a projection lantern, the combination of a transparency carrier comprising a box open to the passage of light rays through it, a door hinged to one edge on the box at the front and having an opening for the passage of light rays, a transparency holder mounted on said door for pivotal movement about the axis of the path of projected light rays and for pivotal movement about an axis transverse to the path of projected light for movement into and out of the path of light, and a second transparency holder mounted for movement as a unit with said first named holder about said first named axis and pivoted about another axis for movement into and out of the path of projected light independent of the movement of the first named holder, and means on each holder for holding a transparency.

8. In a projection lantern, the combination of a transparency carrier having a support on which a slide may rest, a rock shaft on the carrier, an arm on the rock shaft adapted to engage the front of the slide to hold it in its operative position, a second arm on said rock shaft adapted to lie behind the slide, and means for turning the rock shaft.

9. In a projection lantern, the combination of a transparency carrier having a support on which the lower end of the slide may rest, a rock shaft on the carrier above the support and slide, a pair of downward extending arms on the rock shaft adapted to engage the front of the slide at its opposite margins to hold it in vertical position, said rock shaft having a pair of end arms turned inwardly to lie behind the upper margin of the slide, and a forwardly projecting arm on the rock shaft providing means to rock it to free the front arms from the slide and cause the rear arms to tip the upper end of the slide forwardly.

10. In a projection lantern, a source of projected light, a door pivotally mounted for movement about a vertical axis into and out of the path of projected light and having an opening through which the projected light passes, a transparency holder pivotally mounted on said door for movement into and out of the path of projected light and for pivotal movement about the axis of the path of projected light to position the holder transversely relative to the path of projected light, a second transparency holder pivoted to said door for movement into and out of the path of light, a mask interposed between said holders and the door and mounted for rotation about the axis of the path of light, said mask having a plurality of openings of different contour any one of which may be brought into the path of light consequent upon rotation of said mask, and wherein each of said holders is provided with means to support a transparency.

11. In a projection lantern, a source of projected light, a door pivotally mounted for movement about a vertical axis into and out of the path of projected light and having an opening through which the projected light passes, a member mounted on said door for rotation about the axis of the path of projected light and having an opening in registration with the opening in said door, a transparency holder pivotally mounted on said member for movement into and out of the path of projected light in a plane substantially parallel to said path, a second transparency holder pivoted to said member for movement about a horizontal axis and transverse relative to the path of projected light into and out of such path, a mask interposed between said holders and the door and mounted for rotation about the pivotal axis of the last named holder, said mask having a plurality of openings of different contour any one of which may be brought into the path of light consequent upon rotation of said mask, and means on one of said holders to receive an elongated strip of film and a guide to guide such strip across the path of light, and means on the other holder to support an individual transparency.

12. In a projection lantern, a source of projected light, a door pivotally mounted for movement about a vertical axis into and out of the path of projected light and having an opening through which the projected light passes, a transparency holder pivotally mounted on said door for movement into and out of the path of projected light in a plane substantially parallel to said path and for movement about the axis of the path of projected light to position the holder transversely relative to such path, a second transparency holder pivoted to said door for movement about a horizontal axis transverse relative to the path of projected light and into and out of such path, a mask interposed between said holders and the door and mounted for rotation about the pivotal axis of the last named holder, said mask having a plurality of openings of different contour any one of which may be brought into the path of light consequent upon rotation of said mask, said first named holder having a pair of spacially arranged film receiving spools and a guide to guide a strip of film from one spool across the path of light to the other spool, and the other holder having a support on which a slide may rest, a rock shaft having an arm to engage the front of the slide and hold it in position, a second arm adapted to lie behind the slide, resilient means acting to retain the first named slide in engagement with the slide, and manually operable means for turning the rock shaft to cause the last named arm to eject the slide from the holder.

13. In a projection lantern the combination of a base, a source of projected light carried thereby, a transparency carrier mounted on the base in front of the source of light, a transparency holder pivotally mounted on said carrier for movement into and out of the path of projected light, a second transparency holder pivotally mounted on said carrier, and means on said last named holder to carry a different type of transparency than the first named holder, the pivot of the first named holder being positioned for movement of such holder to a position below the path of light when the second named holder is positioned in such path, and the pivot of the second holder being positioned for movement of its holder to a position to the rear of the plane of the first named holder when such first named holder is in position in the path of light.

14. In a projection lantern the combination of a base, a source of projected light carried thereby, a transparency carrier mounted on the base in front of the source of light, a transparency holder pivotally mounted on said carrier for movement into and out of the path of projected light, means on said holder to carry individual transparencies, a second holder pivotally mounted on said carrier and provided with means for carrying an elongated strip comprising a series of transparencies, the pivot of the first named holder being positioned for movement of such holder to a position below the path of light when the second named holder is positioned in such path, and the pivot of the second named holder being positioned for movement of its holder to a position wherein all portions thereof will lie to the rear of a vertical plane passing through the rear face of the first named holder when the first named holder is positioned in the path of light.

CHARLES F. DUTTON.

REFERENCES CITED

The following references are of record in the file of this patent:

UNITED STATES PATENTS

| Number | Name | Date |
| --- | --- | --- |
| 1,159,681 | Kastner | Nov. 9, 1915 |
| 2,251,077 | Stanton | July 29, 1941 |
| 2,330,709 | Harper et al. | Sept. 28, 1943 |
| 2,364,627 | Fassin | Dec. 12, 1944 |

FOREIGN PATENTS

| Number | Country | Date |
| --- | --- | --- |
| 166,304 | Great Britain | July 21, 1921 |